United States Patent
Söderberg et al.

(10) Patent No.: US 8,774,453 B2
(45) Date of Patent: **\*Jul. 8, 2014**

(54) METHOD AND ARRANGEMENT FOR RETRIEVING INFORMATION COMPRISED IN A BARCODE

(71) Applicant: Telefonaktiebolaget L M Ericsson (Publ), Stockholm (SE)

(72) Inventors: Joakim Söderberg, Solna (SE); Jacob Ström, Stockholm (SE); Jonas Alfthan, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,571

(22) Filed: Jun. 19, 2013

(65) Prior Publication Data

US 2013/0292473 A1    Nov. 7, 2013

Related U.S. Application Data

(63) Continuation of application No. 12/918,378, filed as application No. PCT/EP2009/052150 on Feb. 24, 2009, now Pat. No. 8,494,268.

(60) Provisional application No. 61/031,186, filed on Feb. 25, 2008.

(51) Int. Cl.
*G06K 9/00* (2006.01)
*G06K 7/10* (2006.01)

(52) U.S. Cl.
USPC ........... 382/100; 382/181; 382/257; 382/281; 235/462.09

(58) Field of Classification Search
None
See application file for complete search history.

(56) References Cited

U.S. PATENT DOCUMENTS

| | | | | |
|---|---|---|---|---|
| 5,262,871 A * | 11/1993 | Wilder et al. | ............... | 348/307 |
| 5,487,115 A * | 1/1996 | Surka | ............... | 382/296 |
| 5,504,319 A | 4/1996 | Li et al. | | |
| 5,784,102 A * | 7/1998 | Hussey et al. | ............... | 348/296 |
| 6,082,619 A | 7/2000 | Ma et al. | | |
| 6,382,510 B1 | 5/2002 | Ni | | |
| 6,695,209 B1 * | 2/2004 | La | ............... | 235/462.2 |
| 6,993,573 B2 * | 1/2006 | Hunter | ............... | 709/218 |
| 8,150,163 B2 * | 4/2012 | Kruppa | ............... | 382/190 |
| 2006/0126129 A1 * | 6/2006 | Barber et al. | ............... | 358/474 |
| 2007/0069028 A1 * | 3/2007 | Nemet | ............... | 235/462.41 |

(Continued)

FOREIGN PATENT DOCUMENTS

| | | |
|---|---|---|
| EP | 1 087 325 A | 3/2001 |
| JP | 07-143335 | 6/1995 |
| JP | 10-038542 | 2/1998 |
| JP | 2003-203198 | 7/2003 |

*Primary Examiner* — Barry Drennan

(57) ABSTRACT

A method of retrieving information comprised in a barcode is disclosed. The method comprises detecting that the barcode is present in a first image having a first image quality and capturing a first region, acquiring, when it is detected that the barcode is present, a second image having a second image quality and capturing a second region, wherein the second image quality is higher than the first image quality, and wherein the second region at least partly overlaps the first region, and decoding the barcode based on the second image to retrieve the information. A corresponding program product and a corresponding arrangement are also disclosed along with a communication device comprising the arrangement.

20 Claims, 3 Drawing Sheets

(56) References Cited

U.S. PATENT DOCUMENTS

2007/0102520 A1* 5/2007 Carlson et al. ............... 235/454
2007/0183652 A1   8/2007 Backstrom et al.
2011/0262036 A1* 10/2011 Sannier ........................ 382/164

* cited by examiner (a) (b) (c)
(d) (e) (f)

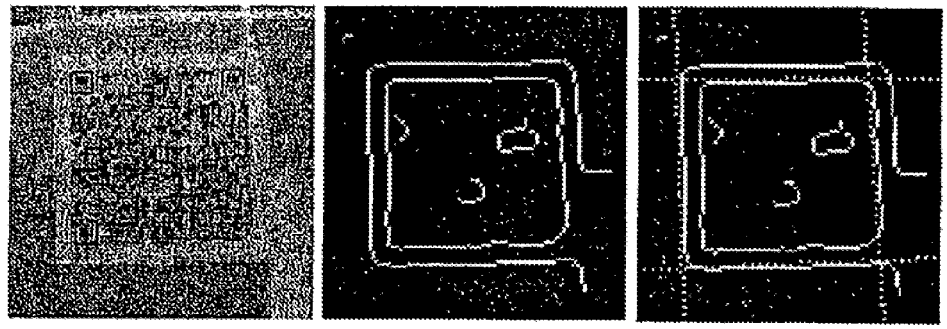
Fig. 8
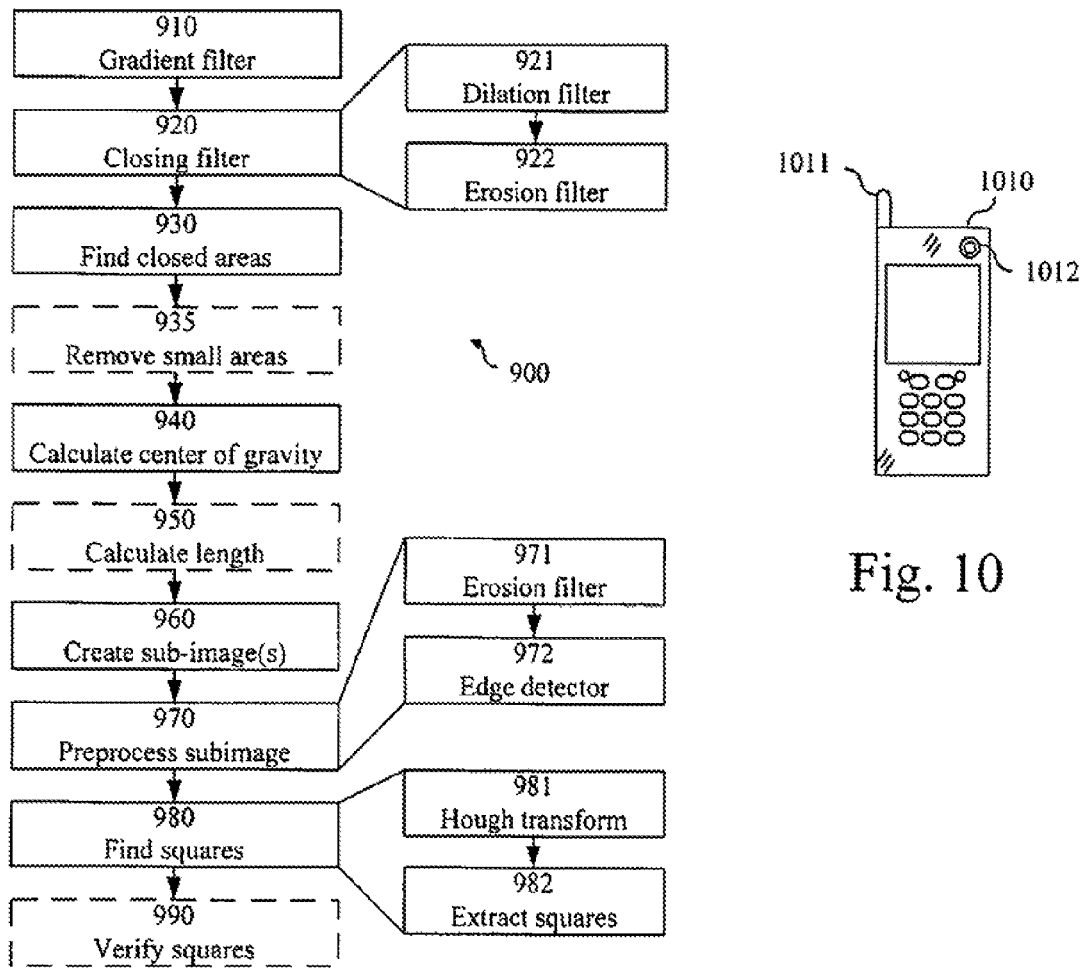
Fig. 9
Fig. 10

METHOD AND ARRANGEMENT FOR RETRIEVING INFORMATION COMPRISED IN A BARCODE

CROSS-REFERENCE TO RELATED APPLICATIONS

This application is a continuation of U.S. application Ser. No. 12/918,378, filed Aug. 19, 2010, pending, which was the National Stage of International Application No. PCT/EP09/52150, filed Feb. 24, 2009, which claims the benefit of U.S. Provisional Application No. 61/031,186, filed Feb. 25, 2008, the disclosure of which is incorporated herein by reference

TECHNICAL FIELD

The present invention relates generally to the field of retrieving information comprised in a barcode.

BACKGROUND

A barcode is a machine-readable representation of information. Barcodes are commonly used to identify products and/or to convey information about products.

FIG. 1 illustrates some exemplary barcodes. The EAN-codes (European Article Number codes) that are commonly used on consumables are represented by the example EAN-code 101. EAN-codes may, for example, be scanned at the counter of grocery stores. An EAN-code is an example of a one-dimensional barcode.

An example of a two-dimensional barcode is represented by the exemplary data matrix 102. This exemplary data matrix is built up by square modules.

Another exemplary barcode type is the OR-codes (Quick Response codes), which is another example of a two-dimensional barcode and is represented by the example OR-code 103. The QR-code is also built up by square modules. In FIG. 1, the modules are depicted as being black or white, but as long as there is acceptable contrast between the colors, any two colors may be used. A OR-code is surrounded by a margin, which is commonly referred to as the quiet zone or the safe zone. This margin may be four modules wide. Currently, QR-codes are widely used in Japan.

Barcodes may be read by optical scanners, such as laser-equipped scanners for EAN-codes, or scanned from an image by special software adapted to read barcodes of a particular type.

When a software program is used to scan a barcode in a photographic image, certain sharpness and resolution of the image may be required. This may impose requirements on the how the image is captured.

Currently, acquisition of the image that is used for barcode reading can be divided into user assisted image acquisition and automatic image acquisition.

In user assisted image acquisition, the user must perform some kind of action, for example pressing a key or button (take a snapshot), in order to capture the image containing the barcode. The requirement of user action makes such systems less user-friendly. In a typical situation, the user must hold the object with the barcode on with one hand, hold the phone/camera that is used to capture the image with the other hand and then press a small button on the phone/camera. This may be rather cumbersome. Furthermore, the act of pressing of the snapshot button may in itself create motion blur in the captured image, since the camera might be moved slightly when pressing the button.

In automatic image acquisition, an image acquisition system may continually capture images and process them in order to read barcodes. Thus, the user no longer has to press a button or key, which makes the system more user-friendly. However, requiring the capturing of a continuous stream of images implies other disadvantages. For example, it is not possible to use advanced image capturing features such as flash and/or auto-focus. Hence, the quality of automatically acquired images may be lower than user assisted acquired images.

Thus, both for user assisted image acquisition and automatic image acquisition, there is a severe risk that the image quality is rather bad. In fact, the quality may be so low so that barcode decoding is impossible. For user assisted image acquisition this may force the user to repeatedly try to capture an image of good enough quality. For automatic image acquisition the system may not respond with decoded information even when a barcode is present.

Therefore, there is a need for methods and arrangements for reading barcode information that are user-friendly and robust.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide methods and arrangements for retrieving information comprised in a barcode.

According to a first aspect of the invention this is achieved by a method of retrieving information comprised in a barcode. The method comprises detecting that the barcode is present in a first image having a first image quality and capturing a first region, acquiring, when it is detected that the barcode is present, a second image having a second image quality and capturing a second region, and decoding the barcode based on the second image to retrieve the information. The second image quality is higher than the first image quality, and the second region at least partly overlaps the first region.

In some embodiments, the barcode may be a one-dimensional barcode, and in some embodiments, the barcode may be a two-dimensional barcode.

In some embodiments, the first image may be an image of an image stream, and in some embodiments, the second image may be a snapshot image.

In some embodiments, the first image quality may have a first resolution, the second image quality may have a second resolution and the first resolution may be lower than the second resolution.

In some embodiments, the acquiring step may comprise applying an auto-focus function. In some embodiments, the acquiring step may comprise illuminating the barcode.

The second region may be equal to the first region in some embodiments, and in some embodiments the second region may be a part if the first region.

In some embodiments, at least the detecting step may be activated without user interaction. In some embodiments, the detecting step may be iterated continuously and may further comprise generating a user alert when it is detected that the barcode is present. In some embodiments, the detecting step, the acquiring step and the decoding step may be activated without user interaction and the method may further comprise generating a user alert when the barcode has been decoded.

In some embodiments the method may further comprise using the information to look up further information on an Internet server.

In some embodiments, the detection step may comprise sliding a window having a first window size over the first image, wherein the first window size is smaller than the first region, generating YUV-histograms—luma and chrominance histograms—for one or more window positions, and evaluating, for one or more window positions, the corresponding YUV-histograms to determine of the barcode is present at the window position. The evaluation step may be performed by a support vector machine algorithm.

In some embodiments, the first image may be represented by a first image signal, and the detection step may comprise applying one or more gradient filters to the first image signal to produce one or more gradient filtered signals, applying one or more dilation filters to the one or more gradient filtered signals to produce one or more dilation filtered signals, applying one or more erosion filters to the one or more dilation filtered signals to produce one or more erosion-filtered signals, finding closed areas in the one or more erosion filtered signals, and calculating, for at least one closed area, corresponding centre of gravity coordinates. The corresponding centre of gravity coordinates may be calculated for all closed areas with a size that is greater than a threshold. The method may, in some embodiments, further comprise calculating, for at least one closed area, a corresponding side length.

In some embodiments, the method may further comprise creating at least one sub-image based on the at least the closed area and the corresponding centre of gravity coordinates, applying an erosion filter to the at least one sub-image to produce at least one erosion filtered sub-image, detecting edges in the at least one erosion filtered sub-image, transforming the at least one erosion filtered sub-image to a Hough domain, and extracting one or more squares from the at least Hough domain sub-image. The method may further comprise verifying the one or more extracted squares based on the detected edges. The step of detecting edges may be performed by a Canny edge detector algorithm.

According to a second aspect of the invention a computer program product is provided. The computer program product comprises a computer readable medium, having thereon a computer program comprising program instructions. The computer program is loadable into a data-processing unit and adapted to cause the data-processing unit to execute method steps according the first aspect of the invention when the computer program is run by the data-processing unit.

According to a third aspect of the invention an arrangement is provided. The arrangement comprises an image-acquiring device adapted to acquire the first and second images according to the first aspect of the invention, and logic adapted to perform at least the detecting and decoding steps according the first aspect of the invention. In some embodiments, the image-acquiring device is a digital camera.

According to a fourth aspect of the invention a communication device is provided which comprises the arrangement according to the third aspect of the invention.

One of the advantages of embodiments of the invention is that barcode information may be read in a robust fashion.

Another advantage of embodiments of the invention is that barcode information may be reliably read.

Another advantage of embodiments of the invention is that barcode information may be read in a user-friendly way.

Another advantage of embodiments of the invention is that a barcode may be detected in an image having a quality that is not suitable for barcode decoding.

Detection of a barcode and possibly its position may be forwarded to the decoding algorithm. This additional information may speed up the decoding process and thus the entire barcode reading process.

BRIEF DESCRIPTION OF THE DRAWINGS

Further objects, features and advantages of the invention will appear from the following detailed description of embodiments of the invention, with reference being made to the accompanying drawings, in which:

FIG. 8 is an image showing a result obtained by using some embodiments of the invention;

FIG. 9 is a flowchart illustrating exemplary method steps according to some embodiments of the invention; and FIG. 10 is a schematic drawing illustrating a mobile terminal, which may comprise an arrangement according to some embodiments of the invention.

DETAILED DESCRIPTION

In the following, embodiments of the invention will be described in which barcode information is retrieved in three steps. This approach provides improved detection and recognition of barcodes.

First, a low quality image may be used to determine or detect whether or not a barcode is present in the image. The image may for example be an image of an image stream that is fed from a camera to a display. The image quality may not be good enough for actual barcode decoding to be possible. Hence, in some embodiments, the algorithms used in this step do not try to retrieve any information from the barcode. Further, in some embodiments, the algorithms used in this step do not even try to localize certain patterns of the barcode (such as the "position patterns" or "finding patterns" of a QR-code). Instead, these embodiments focus on finding an entire barcode based on general code features.

Second, an image of higher quality may be acquired if it is determined, based on the low quality image, that a barcode is present. This step may or may not involve user action. This higher quality image may be acquired as a snapshot of a camera device. The higher quality image may be acquired using quality-enhancing features, such as auto-focus, flash, lamp or other illumination features and/or using higher resolution than the low quality image. The higher quality image may cover the same or a different image area than the lower quality image used in the determining step. In some embodiments, the higher quality image covers only the region where the barcode, as detected in the previous step, is found (either exactly or a slightly larger region).

Thirdly, the higher quality image is used to decode the barcode information. Since the image used in the decoding is of a higher quality, there is a better chance of decoding the bar code correctly than if the lower quality image would have been used in the decoding.

It is to be noted that the entire process may be fully automatic. In such embodiments no user action is required, and the cumbersome process described above in connection with user assisted image acquisition is avoided. On the other hand, high quality images can be acquired, which avoids the problems described above with regard to automatic image acquisition.

It is also to be noted that the barcode reader according to embodiments of the invention may be running in the background without the user even noticing it. For example, the barcode reader may be turned on as soon as the user uses the camera (e.g. removes the lens cover or activates a camera menu). In some embodiments, the first step is running in the background and the user is alerted when a barcode is detected. In such embodiments the user may be asked by a prompt whether or not it is desirable to decode the detected barcode. In some embodiments, all of the three steps are running in the background and the user is not alerted until a successful barcode decoding has been performed.

Figure 1:
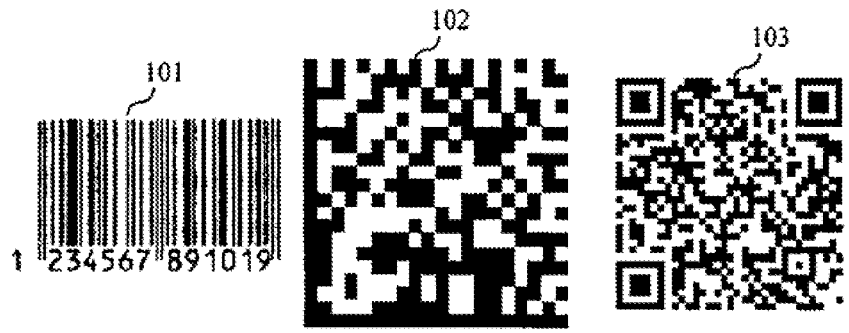
FIG. 1 is an illustration showing examples of barcodes.
Figure 2:
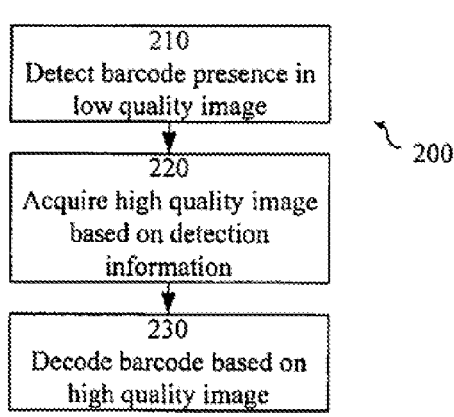
FIG. 2 is a flowchart illustrating exemplary method steps according to some embodiments of the invention.

FIG. 2 is a flowchart illustrating an example of a method 200 according to some embodiments of the invention. In step 210, it is detected whether a barcode is present in a low quality image. In step 220, an image of higher quality is acquired when a barcode is detected. In step 230, the higher quality image is used to decode the detected barcode.

Figure 3:
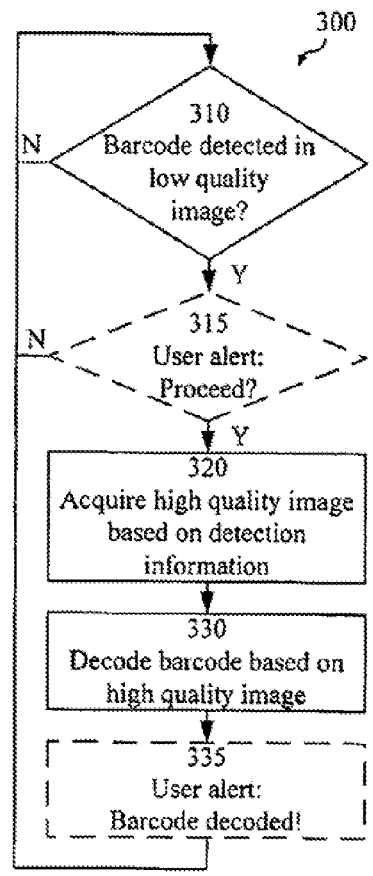
FIG. 3 is a flowchart illustrating exemplary method steps according to some embodiments of the invention.

FIG. 3 is a flowchart illustrating an example method 300 according to some embodiments of the invention. In step 310, it is detected whether a barcode is present in a low quality image. The detecting step is running continuously (NO-path out of step 310) as described above, possibly without user interaction.

When a barcode is detected (YES-path out of step 310) the process proceeds to optional step 315, where a user alert informs the user that a barcode was detected and possibly asks the user if it is desirable to retrieve the barcode information. If the user does not wish to retrieve the barcode information (NO-path out of step 315), the process returns to step 310. If, however, the user wishes to retrieve the barcode information (YES-path out of step 315), the process proceeds to step 320.

In step 320, an image of higher quality is acquired, and the process proceeds to step 330. In step 330, the higher quality image is used to decode the detected barcode, and the process proceeds to optional step 335, where a user is informed that a barcode has been successfully decoded and is possibly given the barcode information.

Using embodiments of the invention, it is possible to apply robust detection algorithms to low quality images, even though such images are not of high enough quality to be used for decoding the bar code.

One example of such a robust detection algorithm uses a detector that searches for rectangular regions in an image. Such a detector may be designed to be much more robust than a barcode reading software (e.g. a barcode decoding algorithm). Since, for example, a QR-code is necessarily a rectangle, it may be sufficient to look for rectangular structures in the low quality image to be able to detect a barcode. When such a structure is found, a higher quality image is acquired and decoded (using a different algorithm than in the detecting step) as explained above.

In some embodiments, the detection step may comprise extracting features from a histogram associated with a barcode. Instead of looking for e.g. the "finding patterns" of a QR-code, the whole code is taken into consideration. Some of these embodiments may use a support vector machine in the detection step.

An image of a OR-code may generate distinguishing YUV-histograms (luma and chrominance histograms). Properties from these histograms may be used as features for detecting the presence of a barcode. In some embodiments, the histograms are evaluated, and if the average luminance (Y-component) is in the center of the spectrum (meaning that the luminance variance is large and no color is under- or overrepresented), then a determination may be made that the image shows, for example, a QR-code.

It is noted that a histogram does not contain information regarding pixel position. Thus, some embodiments use a window that is slid over the image. Then some embodiments use a SVM (support vector machine) to evaluate, for each position of the window, whether the window is positioned over a barcode or not. Some embodiments determine that a barcode is present if an area of the image is filled with pixels that are noted as possible barcode pixels by the SVM.

Some embodiments of the invention process the resulting binary image (comprising pixels that either are or are not possible barcode pixels) further. For example, the binary image may be processed by erosion filters and minimum size conditions may be applied to separate actual barcodes.

Figure 4:
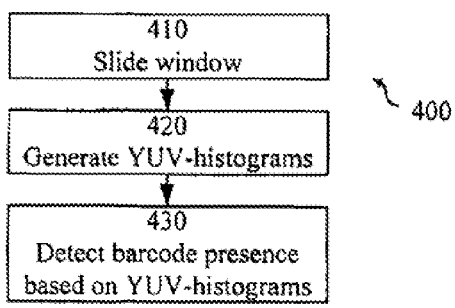
FIG. 4 is a flowchart illustrating exemplary method steps according to some embodiments of the invention.

FIG. 4 is a flowchart illustrating an example method 400 according to some embodiments of the invention. The method 400 may, for example, be performed as part of method step 210 or 310 of FIGS. 2 and 3 respectively.

In step 410, a window is slid over the image to be analyzed. The window may be slid over the entire image or over only a part of the image. In step 420, YUV-histograms are generated for each or some of the window positions. Then, in step 430, it is evaluated for each or some of the window positions where a YUV-histogram was generated whether this window position represents a possible barcode pixel (in some embodiments; a group of possible barcode pixels).

It is to be noted that two or more of steps 410, 420 and 430 may be performed iteratively (e.g. performing all steps for one window position, then all steps for the next window position, etc.) or in sequence (e.g. first performing step 410 for all window positions, then 420 for all window positions, etc.).

Figure 5:
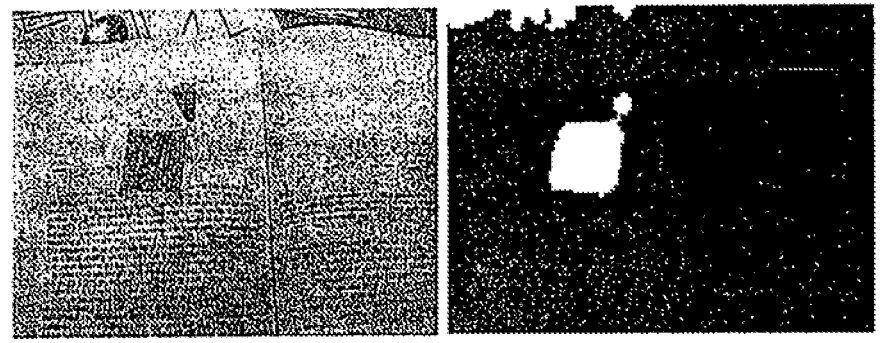
FIG. 5 is an image showing a result obtained by using some embodiments of the invention.

FIG. 5 demonstrates a result obtained by using some embodiments of the invention. The left image shows the original image, and the right image shows the resulting binary image after a window has been slid over the image and YUV-histograms have been generated and evaluated.

In some embodiments, the example algorithm described in connection to FIG. 4 aims at finding areas that vary substantially between black and white. An alternative approach may be to look for high gradients in the image.

Some embodiments employing this alternative focus on features of the code structure, and explore the intensity contrast between pixels in a code. A highly varying intensity may imply a large gradient magnitude, which may indicate the presence of a barcode. Some of these embodiments use gradient filters and closing filters.

The barcode area contains pixels with high intensity differences between each other, which should result in large gradients. Thus, according to some embodiments, areas comprising many pixels with a large gradient magnitude are assumed to imply that the area is a barcode, such as a QR-code. Using the QR-code example, it can also be noted that such a barcode has gradients in all directions. Some embodiments take advantage of this property. Some embodiments that use the gradient properties aim at providing a fast method that gives an indication of the location and size of a possible barcode. According to some embodiments, this indication may be used in more complex methods that distinguish true barcode indications from false alarms. Thus, some embodiments that use the gradient properties aim at providing a method that has a low probability of a missed barcode and leaves it to the more complex subsequent method to determine which indications are actually true barcodes.

Some embodiments focus on separating the environment from the barcode by applying four gradient filters in four different directions and combining the result. An algorithm may be provided that applies a Sobel gradient filter in four different directions and creates four gradient images. These images may be turned into binary images using a threshold value. The binary images may be processed with closing filters and then combined into a result image, for example using a logical AND operation. Some embodiments define all closed areas in the result image as barcodes. In some embodiments, the closed area has to be larger than a predefined threshold to be defined as a barcode.

Figure 6:
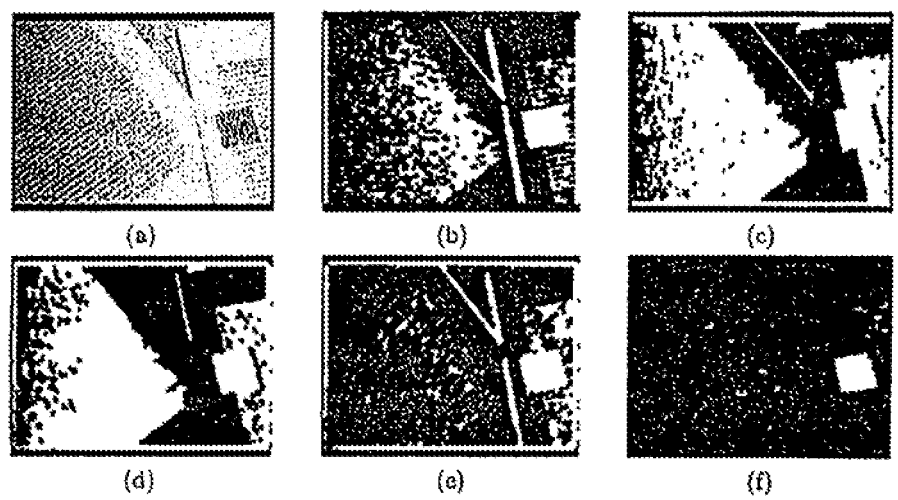
FIG. 6 is an image showing a result obtained by using some embodiments of the invention.

FIG. 6 demonstrates that a QR-code gives rise to high gradients in all four directions, while other image material is unlikely to do so. In FIG. 6, (a) is the original image, (b), (c), (d) and (e) demonstrate the gradient images for the four different directions, and (f) demonstrates the result after performing a logical AND operation between (b), (c), (d) and (e).

The algorithm according to gradient-exploring embodiments may not only present a barcode position but also the approximate barcode size. An advantage of some of these embodiments is that the algorithm is not depending on one threshold, a solution that may be quite sensitive (e.g. making it hard to find the right threshold and making the threshold heavily associated with the data set used to train the algorithm), but instead depends on many thresholds, which makes the algorithm more stable and robust.

Other advantages of some of the gradient-evaluating embodiments are that lines and other sharp borders (that could be hard to separate in a single gradient image) may disappear in the resulting combined image and thus the gradient threshold may be set to a low value and becomes rather insensitive to errors in the threshold tuning.

When evaluating gradient images, it can be noted that, for some example QR-codes, not all barcode pixels get high gradient magnitudes. Instead of lowering the gradient threshold so that the probability that all code pixels are above the threshold is increased, some embodiments handle this by applying a closing filter to each gradient image. The closing filter may be designed to fill out gaps in the barcode and the filter design may also consider the width of the quiet zone. In some embodiments, four different closing filters, one for each gradient image, are used. Some embodiments close the gradient image that evaluates the horizontal gradient more in the horizontal direction than in the vertical direction. Thus, the quiet zone in the horizontal direction stays untouched. A similar closing operation may be performed for the other gradient images before combining them.

Some of the advantages of this approach are that the quiet zone has a higher probability of being preserved intact, and that the gradient threshold can be set with even less precision than in the case with an ordinary, rectangular or square shaped closing filter.

The algorithms used for some of the gradient-evaluating embodiments are based on filters. There are no time-consuming calculations and the algorithms are therefore fast.

The gradient-evaluating embodiments thus described may be used alone to locate a barcode. Alternatively, the output from these algorithms may be viewed as a first step in detecting barcodes. In some of those gradient-evaluating embodiments, where the aim was to produce a low probability of a miss, the result may be further evaluated to avoid a large amount of false alarms.

In the following, embodiments will be described which aim at confirming whether a barcode candidate found by the gradient method really is a barcode. Thus, the output may be an approval or a rejection of an area defined by the gradient method.

Some embodiments extract barcodes from images using its shape (e.g. a square) as the main property. Some embodiments use an erosion filter, a Canny edge detector, the Hough transform and some basic algebra.

According to some embodiments, the regions defined by the gradient method are further evaluated such that if a sub-image centered at the position returned from the gradient method portrays a square with roughly the same size as that concluded by the gradient method, then that area is classified as a barcode. The evaluation may employ a Hough transform.

The computational complexity of the Hough transform increases with a required high detection accuracy and with the size of the detection range. Thus, limiting the range by using the information from the gradient method regarding barcode size and position decreases the computational complexity.

In some embodiments, the method is divided into three parts: preprocessing (where the contrast of the barcode is enhanced), square finding, and square verification. The square verification may reduce detection errors. In combination with the gradient method, this method may aim at preserving a low probability of a miss and, in addition, at getting a low probability of false alarms.

In relation to the preprocessing and edge extraction step, it may be important for successful square detection of, for example, a QR-code to have a good contrast between the quiet zone and the actual barcode. If edge detection is used directly, there is a risk that a square relating to a barcode may not be properly closed and also that there may be many edges found within the barcode square. Using the barcode feature of having a distributed set of black and white pixels, some embodiments may use an erosion filter before applying the edge detection to avoid edges inside the code.

Figure 7:
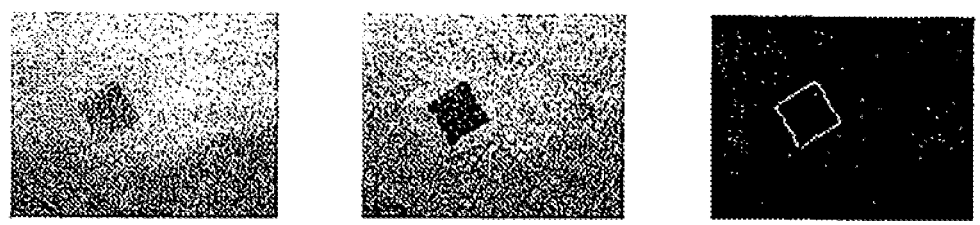
FIG. 7 is an image showing a result obtained by using some embodiments of the invention.

FIG. 7 demonstrates an example result of such embodiments. The left image is the original image, the middle image is the result of the erosion filtering, and the right image is the result of applying an edge detector (Canny edge detector) to the erosion-filtered image. The erosion filter may be designed to account for the width of the quiet zone.

After preprocessing the image, a square search may be performed. In some embodiments, a method of extracting squares from images as proposed in C. R. Jung and R. Schramm, "Rectangle Detection based on a Windowed Hough Transform", Brazilian Symposium on Computer Graphics and Image Processing, 2004 may be used in the square finding step. For each pixel in an edge image, a sub-window covering a certain neighborhood is applied and the Hough transform for lines is computed for the sub-window. By analyzing the Hough transform image, squares (or rectangles) may be found. According to some embodiments, the Hough transform only has to be applied to image parts where it is probable (based on the output from the gradient method) that a barcode is located. If the number of peaks in the Hough image that are above a threshold is reasonably low, the square search may be implemented as a full search where all peaks are tested against the others without symmetry concern. When no symmetry concerns are taken the square search may be carried out in one Hough image for the entire preprocessed image instead of in one Hough image for each pixel and the complexity may be reduced.

When a square is found in Hough space it may be validated according to some embodiments of the invention. The square validation may be carried out against the binary edge image. The square validation may result in that the number of false alarms is further reduced. If all sides of a square that was found in the Hough image can be verified in the binary edge image, then the square may be approved according to some embodiments.

FIG. 8 demonstrates the edge extraction and square finding for an example image. The left image is the original image, the middle image is the result of the edge extraction, and the right image shows the square found through the Hough transform overlaid on the result of the edge extraction.

FIG. 9 is a flowchart illustrating a method 900 according to some embodiments of the invention. The method 900 may, for example, be performed as part of method step 210 or 310 of FIGS. 2 and 3 respectively.

In step 910 one or more gradient filters are applied to an image (possibly in several directions), and in step 920 a closing filter is applied to the result of step 910. The closing filter may comprise a dilation filter and an erosion filter as illustrated by sub-steps 921 and 922.

In step 930 closed areas are found in the image resulting from step 920. This may comprise applying a logical AND operation to the filtered images as explained above. In optional step 935, all found closed areas that are smaller than a threshold may be removed. Then, the center of gravity and side length of each of the remaining closed areas are calculated in steps 940 and 950 respectively. The side length may, for example, be calculated as the square root of the number of pixels in the area.

Steps 910 through 950 represent the gradient method as elaborated on previously. The method may end in step 950 and the result may be used when performing steps 220 or 320 of FIGS. 2 and 3 respectively. In some embodiments, step 950 is also optional. If the side length is not calculated the entire image area or a sub-image area of predefined size and centered at the center of gravity may, for example, be used when performing steps 220 or 320.

Alternatively, the method proceeds to step 960, where one or more sub-images are extracted from the original image based on the information found in steps 940 and 950.

Then in step 970, each of the sub-images are preprocessed to detect edges comprised in the sub-images. The preprocessing may comprise applying an erosion filter and an edge-detecting algorithm (such as a Canny edge detector) as illustrated by sub-steps 971 and 972. The process continues to step 980, where squares are found in the resulting sub-images output from step 970. The square finding may comprise applying a Hough transform and analyzing the result to extract squares as illustrated by sub-steps 981 and 982.

The method may end in step 980 and the result may be used when performing steps 220 or 320 of FIGS. 2 and 3 respectively. Alternatively, the method proceeds to step 990, where the squares found in step 980 are verified with the edges found in step 970. If it is determined that a found square does not have corresponding edges to a sufficient degree, then the found square may be rejected.

Steps 960 through 990 represent the square-finding method as elaborated on previously.

Embodiments of the invention have been described that, by using a simple filter-based method (such as the gradient method) in a step of identifying barcode candidates and then validating the identified areas with a square finding method, can obtain fast and accurate barcode detection results.

Optimal parameter setting may vary depending on the application and may, for example, be found through training data and simulations. Further, different parameter settings may be applied depending on the requirements on the probabilities of a miss and false alarm respectively.

Further details regarding example filters and other tools that may be suitable to use in the detection step of embodiments of the invention may be found in Jonas Alfthan, "Robust Detection of Two-dimensional Barcodes in Blurry Images", master thesis at the department of numerical analysis and computer science at Stockholm University, March 2008 and in the references therein.

FIG. 10 illustrates an example mobile terminal 1010 comprising arrangements according to embodiments of the invention. The mobile terminal 1010 may be connected, through a radio link, to a base station site.

The mobile terminal 1010 is illustrated as a mobile telephone in a schematic front view. This example mobile terminal 1010 comprises an antenna 1011 mounted on the housing of the apparatus. Alternatively, the mobile terminal 1010 may have an internal antenna mounted within the housing of the apparatus. The mobile terminal 1010 may even comprise multiple antennas. The mobile terminal 1010 may further comprise a display, a keypad, a loudspeaker, and a microphone, which together provides a man-machine interface for operating the mobile terminal 1010. The mobile terminal further comprises an image-acquiring device 1012, such as a camera.

The example mobile terminal 1010 may be adapted to connect to a mobile telecommunication network via the wireless link to a radio base station. Hence, a user of the mobile terminal 1010 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 1010 and the base station may be compliant with at least one mobile telecommunication standard, for instance UMTS (Universal Mobile Telecommunication System) or UMTS LTE (UMTS Long Term Evolution). A connection to a mobile communication network may provide the possibility to use decoded barcode information to look up further information (e.g. relating to a product or an event) on an Internet server accessible via the mobile communication network.

The described embodiments of the invention and their equivalents may be realised in software or hardware or a combination thereof. They may be performed by general-purpose circuits associated with or integral to a communication device, such as digital signal processors (DSP), central processing units (CPU), co-processor units, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention. The electronic apparatus may, for example, be a portable or handheld mobile radio communication equipment, a mobile radio terminal, a mobile telephone, a communicator, an electronic organizer, a smartphone, a digital camera, a barcode scanner, a computer, a mobile gaming device, or a (wrist) watch.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIG. 2-4 or 9.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

What is claimed:

1. A method of retrieving information comprised in a barcode comprising:
    detecting whether or not the barcode is present in a first image, the first image being acquired by an image-acquiring device, having a first image quality and capturing a first region, wherein the detecting step is iterated continuously, wherein the first image is represented by a first image signal, and the detecting further comprises:
        applying one or more gradient filters to the first image signal to produce one or more gradient filtered signals,
        applying one or more dilation filters to the one or more gradient filtered signals to produce one or more dilation filtered signals,
        applying one or more erosion filters to the one or more dilation filtered signals to produce one or more erosion-filtered signals,
        finding closed areas in the one or more erosion-filtered signals,
        calculating, for at least one closed area, corresponding center of gravity coordinates,
        creating at least one sub-image based on the at least the closed area and the corresponding center of gravity coordinates,
        applying an erosion filter to the at least one sub-image to produce at least one erosion filtered sub-image,
        detecting edges in the at least one erosion filtered sub-image,
        transforming the at least one erosion-filtered sub-image to a Hough domain, and
        extracting one or more squares from the at least one erosion-filtered sub-image transformed to the Hough domain;
    acquiring by the image-acquiring device, when it is detected that the barcode is present, a second image having a second image quality and capturing a second region, wherein the second image quality is higher than the first image quality, and wherein the second region at least partly overlaps the first region; and
    decoding the barcode based on the second image to retrieve the information.

2. The method of claim 1, wherein the barcode is a one-dimensional barcode.

3. The method of claim 1, wherein the barcode is a two-dimensional barcode.

4. The method of claim 1, wherein the first image is an image of an image stream.

5. The method of claim 1, wherein the second image is a snapshot image.

6. The method of claim 1, wherein the first image quality has a first resolution, the second image quality has a second resolution and the first resolution is lower than the second resolution.

7. The method of claim 1, wherein the acquiring step comprises applying an auto-focus function.

8. The method of claim 1, wherein the acquiring step comprises illuminating the barcode.

9. The method of claim 1, wherein the second region is equal to the first region.

10. The method of claim 1, wherein the second region is a part of the first region.

11. The method of claim 1, wherein at least the detecting step is activated without user interaction.

12. The method of claim 11, further comprising generating a user alert when it is detected that the barcode is present.

13. The method of claim 11, wherein the detecting step, the acquiring step and the decoding step are activated without user interaction and further comprising generating a user alert when the barcode has been decoded.

14. The method of claim 1, further comprising using the information to look up further information on an Internet server.

15. The method of claim 1, wherein the one or more gradient filters comprises two or more gradient filters in different directions.

16. The method of claim 1, wherein the one or more gradient filters comprises four gradient filters in four different directions.

17. The method of claim 1, wherein the corresponding center of gravity coordinates are calculated for all closed areas with a size that is greater than a threshold.

18. The method of claim 1, further comprising calculating for at least one closed area, a corresponding side length.

19. The method of claim 1, further comprising verifying the one or more extracted squares based on the detected edges.

20. The method of claim 1 wherein the step of detecting edges is performed by a Canny edge detector algorithm.

* * * * *

UNITED STATES PATENT AND TRADEMARK OFFICE
CERTIFICATE OF CORRECTION

PATENT NO. : 8,774,453 B2  Page 1 of 1
APPLICATION NO. : 13/921571
DATED : July 8, 2014
INVENTOR(S) : Söderberg et al.

It is certified that error appears in the above-identified patent and that said Letters Patent is hereby corrected as shown below:

In the Specification

In Column 1, Line 35, delete "OR-codes" and insert -- QR-codes --, therefor.

In Column 1, Line 37, delete "OR-code" and insert -- QR-code --, therefor.

In Column 1, Line 41, delete "OR-code" and insert -- QR-code --, therefor.

In Column 2, Line 59, delete "part if" and insert -- part of --, therefor.

In Column 6, Line 4, delete "OR-code" and insert -- QR-code --, therefor.

Signed and Sealed this
Twenty-first Day of October, 2014

Michelle K. Lee
*Deputy Director of the United States Patent and Trademark Office*